United States Patent [19]
Olszewski et al.

[11] 4,110,001
[45] Aug. 29, 1978

[54] OPTICAL FIBER CABLE CONSTRUCTION

[75] Inventors: Jerzy A. Olszewski, Edison; Arnab Sarkar, Fords, both of N.J.

[73] Assignee: General Cable Corporation, Greenwich, Conn.

[21] Appl. No.: 756,979

[22] Filed: Jan. 5, 1977

[51] Int. Cl.² ............................................. G02B 5/16
[52] U.S. Cl. ................................................. 350/96.23
[58] Field of Search ........................... 350/96 B, 96 BR

[56] References Cited

U.S. PATENT DOCUMENTS

| 3,883,218 | 5/1975 | Slaughter | 350/96 BR |
| 4,038,489 | 7/1977 | Stenson et al. | 350/96 BR |

FOREIGN PATENT DOCUMENTS

| 2,508,315 | 9/1976 | Fed. Rep. of Germany | 350/96 BR |
| 2,507,583 | 9/1976 | Fed. Rep. of Germany | 350/96 BR |

OTHER PUBLICATIONS

Proc. IEE, vol. 123, No. 6, Jun. 76 by Foord et al., pp. 597-602, "Principles of Fibre-Optical Cable Design".

Primary Examiner—John K. Corbin
Assistant Examiner—Stewart Levy
Attorney, Agent, or Firm—Roy C. Hopgood; John M. Calimafde; Charles W. Neill

[57] ABSTRACT

This optical fiber cable has the optical fibers adhered to a support. An assembly including the fibers and the support is carried by a core element having a helical channel in which the fiber assembly is located and free to adjust itself to accommodate bending of the cable without subjecting the optical fibers to pressure or to bends that are excessively sharp. The construction also avoids pressure on the optical fibers from binders, core tapes, or the cable sheath when the cable is bent. It also avoids micro-bending losses. Locating of the optical fibers closer to the cable axis further decreases bending losses.

18 Claims, 4 Drawing Figures

OPTICAL FIBER CABLE CONSTRUCTION

BACKGROUND AND SUMMARY OF THE INVENTION

The present invention relates to packaging of optical fibers to form cables for use in transmission of optical signals. It further relates to, but is not limited to, cables containing a number of optical fibers each used as a channel for signal transmission in a given direction.

The primary consideration for such cables is that increases in optical signal attenuation, due to distortion of fiber axis, as a consequence of packaging, should be minimized and preferably eliminated. Other considerations include appropriate mechanical properties for specific types of installations and ease of access to fibers for termination and splicing.

The present invention is a construction of a cable utilizing tapes of multiple fibers as a sub-assembly. However, the construction improves on the concept of wrapping over a core and recognizes the necessity for incorporating pairs in the cable for repeater power feed, order and fault location. It also recognizes the necessity of pressurization from installed cable maintenance consideration in the absence of suitable fault-locating devices.

One embodiment of this invention has an extruded plastic core with one or more, preferably at least two, helical grooves. The core should preferably (but may not) have a central strength member in the core for axial strength. One or more tapes may be placed in each groove. Metallic pairs may also be placed in a groove.

To prevent the optical fiber tapes or pairs from coming out of the grooves, the cable core may be bound with binders, tapes with or without longitudinal core wraps. Appropriate sheaths may be applied on the cable core for completing the cable. The sheath may incorporate a strength member to provide axial strength as well. It should also provide necessary compressive or impact strength and should be suitable for pressurization when needed.

One such sheath may be a continuously welded metal tube followed by a polyethylene jacket. Corrugated steel longitudinally folded with overlap and flooded with asphaltic compound may be applied over the inner jacket, followed by a polyethylene outer jacket.

Advantages of placing tapes in a helical groove, with sizable depth, over wrapping on a core will be pointed out in describing the structure shown in the drawing.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
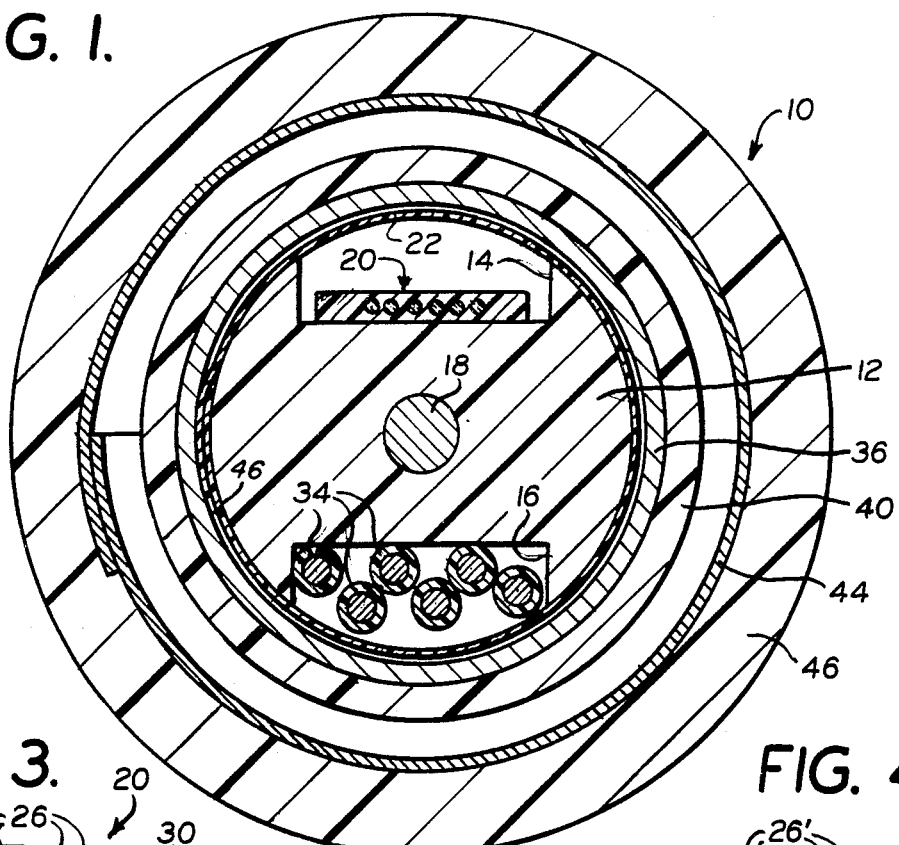
FIG. 1 is an enlarged, sectional view of an optical fiber cable made in accordance with this invention.

FIG. 1 shows an optical fiber cable 10 having a core 12 which is preferably made of plastic material which is flexible enough to accommodate itself to bending of the cable, but stiff enough to resist distortion of the shape of channels 14 and 16 which are formed in the side of the core 12. The channels 14 and 16 are preferably helical as they extend lengthwise along the core. The lay of the helix may be approximately 1 foot, this being given merely by way of illustration.

In the construction illustrated, the core 12 has a center strength member 18 which may be a steel cable or other reinforcement, depending upon the service for which the cable is intended. If the core 12 is made without any center strength member 18, then the core can be extruded with the channels 14 and 16 formed during the extrusion. However, if the core is made with the center strength member 18, it has been found more practical to cut the grooves or channels 14 and 16 in the surface of the core after the core has cooled to room temperature. The radial depth of the channels 14 and 16 is approximately $\frac{1}{4}$ to $\frac{1}{3}$ of the diameter of the core, for each channel, these proportions being given by way of illustration.

A fiber assembly 20 is located in the channel 14. This assembly 20 is shown resting on the bottom of the channel 14, but at some locations along the length of the cable where the channel is located at different angles around its helical path, the fiber assembly 20 may not touch the bottom of the channel, and there is no connection between the assembly 20 and the core 12. It is a feature of the invention that the channel 14 is deep enough so that it always provides space for the fiber assembly 20 without causing the fiber assembly to be compressed against a core wrap 22 which extends around the circumference of the core 12.

The fiber assembly 20 includes an inner tape 24 which may be made of stiff plastic. Plastic-coated glass fibers 26 are adhered to the top surface of the inner tape 24 by adhesive 28. This adhesive is applied cold, and conventional pressure-sensitive adhesive can be used to hold the optical fibers 26 spaced from one another and in parallel relation in the center region of the fiber assembly 20. An outer tape 30 covers the tops of the optical fibers 26, but does not adhere to them. The fiber assembly 20 may include more than one layer of tape 24 and fibers 26.

The reason for having the outer tape touch the optical fibers without adhering to them is to prevent any shear forces on the optical fibers when the assembly 20 is bent as a result of bending of the cable. The edges of the outer layer tape 30 beyond the optical fibers 26 are pressed down into contact with the inner tape 24 and are adhered to the inner tape by the adhesive 28.

Figure 3:
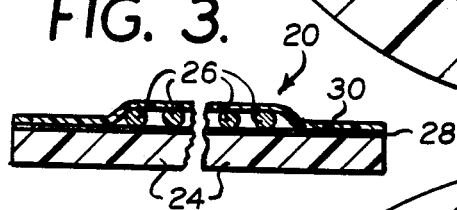
FIG. 3 is an enlarged detail view of the fiber assembly.
Figure 4:
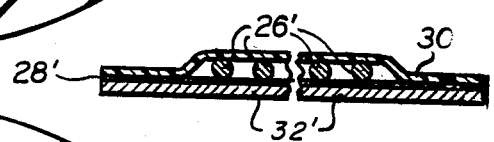
FIG. 4 is a view similar to FIG. 3 but showing a modified construction.

FIG. 4 shows a modified construction of the fiber assembly 20 with a metal tape 32 substituted for the plastic tape 24 of FIG. 3. The optical fibers 26' of FIG. 4 are adhered to the strip 32 by adhesive 28' and the fiber assembly of FIG. 4 has an outer tape 30', so that the construction in FIG. 4 is the same as FIG. 3 except for the material used for the inner tape. The advantage of using metal instead of fiber for the inner tape 24 is that the metal ordinarily has lower coefficient of thermal expansion and more resilience than a fiber tape and accommodates itself better to curves and torsion of the fiber assembly 20 without imposing stresses on the optical fibers.

The core 12 can be made of polyethylene, polyvinyl chloride or other conventional plastics, compounded, if necessary, to provide sufficient stiffness so that the sides of the channel 14 will not be distorted into position to compress any part of the fiber assembly 20 when the cable is bent sharply or subject to impact blows from without. In order to adhere the core 12 to the strength member 18, when the strength member is made of steel, it is preferable to copper clad the steel, since some plastics adhere better to copper than to steel.

The channel 16 is used to accommodate metallic pairs, if these are needed for repeater power feed, order and fault location. The channels also provide space for pressurizing the cable 10. The metallic pairs 34 have conventional insulation and are placed in the groove 16 without being adhered to the bottom or sides of the groove and without being adhered to one another.

The core wrap 22 is shown as an overlapped tape in FIG. 1; but other conventional core wraps can be used, and this wrap 22 is to be considered part of the core 12. A metal tube 36 extends around the entire circumference of the core 12, and this tube 36 is preferably a longitudinal seam aluminum tube with the seam welded so that the tube retains any pressure which is used to pressurize the cable. The welded seam is indicated in FIG. 1 by the reference character 36.

The core 10 is a "rattle" fit in the metal tube 36. Preferably, a difference of about 100 mils exist between the outside diameter of the core 12 and the inside diameter of the metal tube 36. The core will, of course, rest on the bottom of the tube along straight runs of the cable; and will contact with the top or sides of the tube at other locations where the cable is bent around a curve or over a hump. The clearance between the core and the inside surface of the metal tube serves several purposes. One is that it provides clearance for the passage of air or other gas with which the cable may be pressurized. Another is that the space provides a barrier to heat transfer from the metal tube to the core, particularly during manufacture when outer jackets are extruded over the cable. The space between the core and the metal tube also gives the cable greater flexibility when it becomes necessary to bend it.

An inner plastic jacket 40 is applied over the metallic tube 36, preferably by extrusion. The metal tube 36 serves as a heat sink to protect the core 12 from the heat with which the jacket 40 is extruded. The tube 36 is made of metal of substantial thickness, not only to provide a better heat sink but also to make the metal tube 36 a strength member for the cable. If the cable has a strength member 18 at the center, the metal tube 36 provides for additional tensile strength for pulling the cable into conduits, such as are used underground and in buildings. The wall thickness of the tube 36 may be about 50 mils, by way of example.

To provide additional protection for the cable 10, particularly where the cable is to be used underground, a steel armor 44 is provided over the inner jacket 40. This steel armor 44 is preferably corrugated on cables of large size to facilitate the bending of the cable. Such corrugations extending in a circumferential direction around the cable are well known. The armor 44 can be welded along its seam 46 and can be coated to prevent it from corroding. The metal tube 36 will ordinarily be coated with a corrosion-resistant coating in accordance with conventional cable practice. An outer jacket 46 surrounds the corrugated steel armor 44 and may be extruded over the armor 44 so as to fill the undulations in the outer surface of the armor 44.

Figure 2:
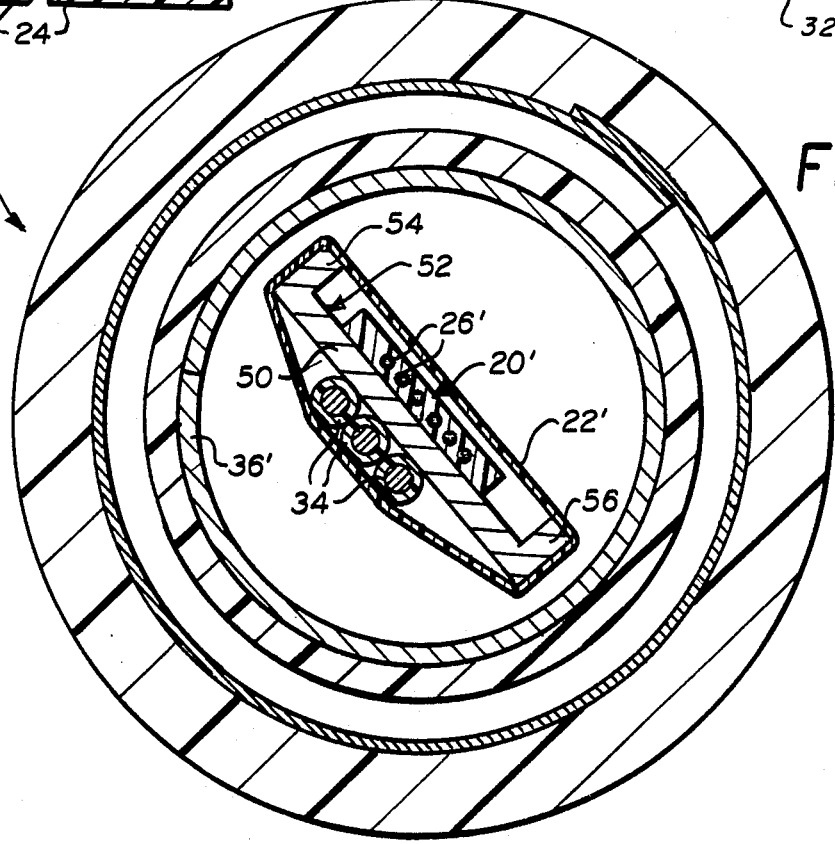
FIG. 2 is a view similar to FIG. 1 but showing a modified structure for supporting the optical fiber assembly.

FIG. 2 shows a cable which is similar to that in FIG. 1 except for the construction of the core. In FIG. 2, the core includes a core element 50, which is preferably made of metal and which has a channel 52 on one side. Structure shown in FIG. 2 which corresponds with that in FIG. 1 is indicated by the same reference character with a prime appended.

The channel 52 has sidewalls 54 and 56; and there is a fiber assembly 20' located within the channel 52. The core element 50 is torsioned to give it a spiral or helical contour, and the channel 52 follows a helical path. The fiber assembly 20' may be of the same construction as shown in FIGS. 3 and 4, but the channel 52 need not be as deep in FIG. 2 as it is in FIG. 1, because the fiber assembly is nearer to the neutral axis of the cable when the cable is bent, and thus there is less movement of the fiber assembly 20' as a result of bending of the cable.

There is a core wrap 22 around the core element 50, and the sides 54 and 56 of the channel 52 hold the core wrap 22 out of contact with the fiber assembly 20', except at such times as the fiber assembly may touch the core wrap 22' as a result of sharp bends in the cable.

The long dimension of the core element 50 is less than the inside diameter of the metal tube 36', so that the core structure in FIG. 2 is a "rattle fit" in the tube 36'; but when the cable is bent in certain directions with respect to the direction of extent of the long dimension of the core element 50, the tube 36 may distort sufficiently to touch both ends of the core element 50. Insulated metallic conductor pairs 34 may be secured to the core element 50 on the side opposite the fiber assembly 20', if desired.

The metal tube 36 and the additional structure of the cable 10 beyond the metal tube 36' are shown with the same construction as in FIG. 1. The metal tube 36' is preferably made with sufficient wall thickness to provide a heat sink to protect the structure within the tube 36' from excessive heating when the inner jacket 40' is extruded over the metal tube 36'. The tube 10' has substantially larger air space within it for the passage of air or other gas for pressurizing the cable.

The preferred embodiments of the invention have been illustrated and described, but changes and modifications can be made and some features can be used in different combinations without departing from the invention as defined in the claims.

What is claimed is:

1. An optical fiber cable including in combination an axially extending core element having a channel in the perimeter surface thereof, said channel following a generally helical path along the length of the cable, a fiber assembly including a tape having an inner face confronting a bottom surface of the channel nearest to axis of the core and resting on said bottom surface of the channel along part of the length of the cable, and a fiber carried by the tape and adhered to the surface of the tape that faces away from the bottom of the channel, the fiber being spaced from the bottom of the channel by the thickness of the tape, the radial depth of the channel being enough greater than the thickness of the fiber assembly to prevent the fiber assembly from reaching to the top of the channel, as the result of any bending of the cable, and also to prevent compressing the optical fiber against any structure of the cable extending across the top of said channel.

2. The optical fiber cable described in claim 1 characterized by the channel being wider than the fiber assembly for the full depth of the channel.

3. The optical fiber cable described in claim 1 characterized by the inner tape being made of resilient metal and the optical fiber being adhered to the surface of the tape that faces away from the bottom of the channel, and the tape being free to slide on the bottom of the channel.

4. The optical fiber cable described in claim 1 characterized by the core element beyond the channel having a generally cylindrical circumference and the channel having a radial depth equal to approximately ¼ to ⅓ of the diameter of said circumference.

5. The optical fiber cable described in claim 1 characterized by the core element having two channels therein and being otherwise of generally cylindrical cross-section, the fiber assembly being located in one channel and insulated metal conductors located in the other channel.

6. The optical fiber cable described in claim 1 characterized by a plurality of optical fibers on top of the tape which comprises an inner tape of the fiber assembly, an outer tape overlying the optic fibers and in contact with the upper sides of the fibers, the fibers being adhered to one of the tapes but not adhered to the other tape so that bending of the fiber assembly leaves the fibers free to follow the curve of the tape to which they are adhered, and both of said tapes being adhered to one another at locations spaced transversely of the tapes from the optical fibers.

7. The optical fiber cable described in claim 6 characterized by the optical fibers being spaced from and generally parallel to one another across an intermediate part of the width of the tapes, pressure-sensitive adhesive that adheres the optical fibers to the top surface of the inner tape and the adhesive being one that can be applied cold so that the optical fibers are adhered to the inner tape without heat, and the outer tape being adhered to the inner tape by the adhesive on the inner tape beyond the optical fibers.

8. The optical fiber cable described in claim 6 characterized by the inner tape being stiffer than the outer tape and being resilient.

9. The optical fiber cable described in claim 1 characterized by a metal tube that surrounds and that is free of corrugations having circumferential components of extent, and in which the core element is a loose fit and rattles in the tube when the cable is shaken, and a jacket around the outside of the metal tube, the jacket being a plastic extrudate.

10. The optical fiber cable described in claim 9 characterized by the metal tube having a wall thickness sufficient to serve as a heat sink that cooperates with the clearance between the core element and the tube to protect the optical fibers from the heat of the outer jacket when the jacket is extruded over the tube.

11. The optical fiber cable described in claim 10 characterized by the tube being an aluminum tube of about 50 mils wall thickness, the tube having an inside diameter greater than the outside diameter of the core element, the difference in diameter being about 100 mils.

12. The optical fiber cable described in claim 1 characterized by the core element having a substantially cylindrical circumference beyond both sides of the channel, and a cylindrical tube surrounding the core element and constituting the principal strength member for pulling the cable into conduits with no consequential elongation of the cable.

13. The optical fiber cable described in claim 12 characterized by the core element being a plastic extrudate with a wire as a second strength member, the wire being located along the axis of the cable and within the core element.

14. The optical fiber cable described in claim 13 characterized by the core element being made of stiff plastic that resists distortion of the sides of the channel into compressive contact with the fiber assembly during bending of the cable, and the wire being a steel wire with copper cladding to insure good adhesion of the core element to the steel wire.

15. The optical fiber cable described in claim 1 characterized by the core element being enclosed in a metal tube and the cross-section and maximum width of the core element, in a plane normal to the axis of the cable, being much less than the cross-section and maximum width of the inside of the tube, the core element having an elongated portion of a length less than the inside diameter of the tube but substantially greater than the inside radius of the tube, said elongated portion passing through or adjacent to the longitudinal axis of the cable for all positions of the core element in the tube, extensions projecting from the elongated portion outward therefrom to form a channel on one side of the elongated portion, the fiber assembly being located in the channel so formed.

16. The optical fiber cable described in claim 15 characterized by the channel being deeper than the thickness of the fiber assembly, and a core wrap around the core element and across the open part of the channel and held out of contact with the fiber assembly by the extensions that project outward from the elongated portion of the core element when the fiber assembly is adjacent to the core element.

17. The optical fiber cable described in claim 16 characterized by insulated metal conductors held against the side of the elongated portion of the core element on the side thereof opposite to the fiber assembly, and a core wrap that contacts with the insulated metal conductors to hold them against said side, the core wrap extending beyond said side and over other surfaces of the core element.

18. The optical fiber cable described in claim 15 characterized by the length of the elongated portion of the core element being more than 10 times as great as the thickness of the core element to bring the optical fibers, carried by the core element, closer to the neutral axis about which the cable bends.

* * * * *